US005689787A

United States Patent [19]

Tombs et al.

[11] Patent Number: 5,689,787

[45] Date of Patent: Nov. 18, 1997

[54] TRANSFER MEMBER HAVING SECTIONED SURFACE COATING TO ENHANCE MICRO-COMPLIANCE

[75] Inventors: Thomas N. Tombs, Brockport; Donald S. Rimai, Webster; David J. Quesnel, Pittsford; William B. Vreeland, Webster, all of N.Y.

[73] Assignee: Eastman Kodak Company, Rochester, N.Y.

[21] Appl. No.: 648,846

[22] Filed: May 16, 1996

[51] Int. Cl.[6] .............................. G03G 15/16; B32B 3/00

[52] U.S. Cl. ............................ 399/308; 428/155; 492/37

[58] Field of Search .................................. 355/271–275, 355/277; 492/18, 38, 30, 37; 399/308, 174, 176, 239, 276, 279, 286, 313, 347, 302, 318; 428/141, 152, 155

[56] References Cited

U.S. PATENT DOCUMENTS

| | | | |
|---|---|---|---|
| 2,287,768 | 6/1942 | Eckstein | 492/38 |
| 3,795,441 | 3/1974 | Hoffman et al. . | |
| 3,878,100 | 4/1975 | Bixler . | |
| 3,936,170 | 2/1976 | Shibano et al. . | |
| 3,993,021 | 11/1976 | Kline . | |
| 4,105,320 | 8/1978 | Bean . | |
| 4,290,761 | 9/1981 | Suginaka | 492/38 |
| 4,481,244 | 11/1984 | Haruta et al. | 428/155 |
| 4,571,798 | 2/1986 | Adams | 492/37 |
| 4,737,433 | 4/1988 | Rimai et al. | 430/111 |
| 4,764,445 | 8/1988 | Miskinis et al. | 430/108 |
| 5,084,735 | 1/1992 | Rimai et al. | 355/271 |
| 5,156,915 | 10/1992 | Wilson et al. | 428/428.8 |
| 5,187,526 | 2/1993 | Zaretsky | 355/273 |
| 5,212,032 | 5/1993 | Wilson et al. | 430/65 |
| 5,217,838 | 6/1993 | Wilson et al. | 430/126 |
| 5,250,357 | 10/1993 | Wilson et al. | 428/425.8 |
| 5,364,685 | 11/1994 | Nakashima et al. | 428/155 |
| 5,600,420 | 2/1997 | Saito et al. | 399/302 |

OTHER PUBLICATIONS

Schaffert, Electrophotography, 1975, pp. 514–519.

Dessauer & Clark, Xerography and Related Processes, p. 393.

Goel & Spencer, Toner Particle–Photoceptor Adhesion, Polym. Sci. Technol., 1975, 9B, pp. 763–827.

*Primary Examiner*—Robert Beatty

*Attorney, Agent, or Firm*—Nelson Adrian Blish

[57] ABSTRACT

A small particle toner image is formed on a primary image member (21), such as a photoconductor; electrostatically transferred to an intermediate transfer member (42); and then electrostatically transferred to a receiving sheet. The intermediate transfer member (42) includes a substrate, a compliant blanket (19), and a thin, hard overcoat (80) sectioned into small, discreet segments (81).

21 Claims, 6 Drawing Sheets

TRANSFER MEMBER HAVING SECTIONED SURFACE COATING TO ENHANCE MICRO-COMPLIANCE

BACKGROUND OF THE INVENTION

1. Field of the Invention

This invention relates in general to the transfer of electrostatically formed toner images using an intermediate transfer member, and in particular, to creation of multi-color toner images with small particle toners, using an intermediate transfer member with a surface sectioned to enhance the transfer of the toner particles.

2. Description of the Prior Art

The use of an intermediate transfer member is useful in electrophotography for a number of reasons, including simplified receiving sheet handling, single pass duplexing, saving wear on photoconductors and superposition of images to form multi-color images. Typically, a toner image is created on a photoconductive member electrophotographically, and is then transferred to an intermediate transfer member, such as a roller or web. For example, a negatively charged toner image is transferred from a photoconductor having an electrically grounded backing electrode, to an intermediate web or roller biased to a strong positive polarity. The toner image is then transferred from the intermediate member to a receiving sheet under the influence of a second electric field. The second electric field can be created, without changing the voltage on the intermediate member, by placing a roller behind the receiving sheet, which is biased in a stronger, positive direction.

The most desirable use of intermediate transfer is for creating multi-color images. When an intermediate transfer member is used, two, three, four or more separate images of different color can be transferred in registration to the intermediate transfer member to create a multi-color image. The multi-color image can then be transferred in one step to the receiving sheet. This system has a number of advantages over the more conventional approach to making multi-color images in which the receiver sheet is secured to the periphery of a roller and rotated repeatedly into transfer relation with the photoconductor to receive the color images directly. The most important advantage is that the receiving sheet itself does not have to be attached to a roller. Attaching the receiving sheet to a roller has been a source of misregistration of images due to independently transferring each color image to the receiver, as well as complexity in apparatus. Other advantages, such as wear and tear on the photoconductive member and a straight and simple receiving sheet path are also important.

High resolution in electrophotographic color printing is desirable. In order to obtain higher resolution, fine toners are necessary. Toners less than 20 μm, and especially toners less than 10 μm in size, give substantially improved resolution in color imaging with high quality equipment. Unfortunately, fine toners are more difficult to transfer electrostatically than are traditional coarse toners. This is a problem using both single transfer and intermediate transfer members.

When transferring toners having a volume weighted average diameter less than 12 μm, and using electrostatics at both transfers, a number of transfer artifacts occur. For example, a well known artifact called "hollow character" is a result of insufficient transfer in the middle of high density toned areas, e.g., in alphanumerics. Another artifact, "halo" is experienced when toner fails to transfer next to a dense portion of an image. These problems cannot be eliminated merely by an increase of the transfer field, since that expedient is limited by electrical breakdown.

Another problem is that typical receivers have a surface roughness with surface irregularities having larger dimensions than the diameters of the small toner particles, as shown in FIG. 1. In low density areas, some particles 12 will be adjacent to peaks 13 in the roughness profile of the receiver 14 while others will be adjacent to valleys 15. When surface forces are balanced or nearly balanced the applied electrostatic transfer force determines which surface the particle remains on when the surfaces are subsequently separated. Particles near the receiver peaks will contact both surfaces and will transfer to the receiver because of the balance of surface forces. Particles adjacent to valleys in the receiver never contact the receiver and do not transfer because the surface forces are not balanced. In this case the electrostatic force on the small particles can not be made large enough to overcome the surface forces holding the particles to the imaging surface because of the limitation imposed by electric field breakdown. See Schaffert, R. M., *Electrography*, Focal Press, New York, 1975, pp. 514–518.

Incomplete transfer can also be caused by toner particles having varying sizes. Larger toner particles, shown in FIG. 2, may contact both transfer surfaces while nearby smaller particles 17 do not. Larger particles, therefore, are preferentially transferred. (To simplify the description, both transfer surfaces shown are smooth in FIG. 2.) A similar problem occurs when stacks of large toner particles are adjacent to stacks of smaller toner particles. These effects are compounded by the previously as described problem of rough receivers. Both effects contribute to a reduction in transfer efficiency and degradation in the granularity of the image, especially in areas with low toner densities.

Rimai and Chowdry have shown that by avoiding air gaps between toner and receiver, the surface forces can be at least partially balanced, thereby permitting images made using small toner particles to be transferred with high efficiency. See Rimai and Chowdry, U.S. Pat. No. 4,737,433. See, also, Dessauer and Clark, *Xerography and Related Processes*, page 393, Focal Press (N.Y.), N. S. Goel, and P. R. Spencer, *Polym. Sci. Technol.* 9B, pp. 763–827 (1975).

Use of a simple compliant intermediate transfer member improves transfer efficiency compared to a non-compliant intermediate transfer member, because it conforms to the low frequency variations in the roughness of the receivers, and to any peaks caused by particulate contamination.

One attempt to solve the small toner transfer problem is disclosed in Rimai et at, U.S. Pat. No. 5,084,735 and Zaretsky, U.S. Pat. No. 5,187,526. These patents discloses use of an intermediate transfer member with a compliant intermediate blanket with a thin overcoat which has a higher Young's modulus than the underlying blanket. The blanket gives compliance whereas the overcoat controls adhesion. Under pressure at a transfer point, the compliant blanket conforms to the profile of a relatively rough receiver, which balances the surface forces, and the thin, hard overcoat improves the release properties of the toner. The overcoat is necessary because the compliant blanket is too "sticky" to allow the toner to be transferred to a receiver, usually paper, and particles become embedded in the soft material of the compliant blanket, thereby increasing the surface holding force. This adhesive force cannot be balanced by the surface forces attracting the particles to the receiver.

SUMMARY OF THE INVENTION

It is the object of the invention to provide a method and apparatus for transferring toner images electrostatically from a first image member, to an intermediate transfer member, to a receiving sheet, with a minimum of image defects and a maximum of toner transferred.

The above and other objects are accomplished by forming a toner image on a receiving sheet in which an electrostatic image is first formed on a primary image member, the electrostatic image is toned with a dry toner to form a toner image, and the toner image is transferred from the primary image member in the presence of an electric field urging toner particles from the primary image member to the intermediate transfer member. The toner image is then transferred from the intermediate transfer member to a receiving sheet in the presence of an electric field urging the toner particles from the intermediate transfer member to the receiving sheet.

The invention is characterized by an intermediate transfer member, comprised of a substrate, a relatively thick compliant blanket of elastomeric material, and a hard, thin surface overcoat sectioned into segments. According to a preferred embodiment, the segments are formed by breaking the hard overcoat into discrete, small segments, which remain bonded to the compliant blanket. The defining feature of the invention, the sectioned overcoat, enhances the micro-compliance of the intermediate transfer member. In other words, the new structure conforms more completely to the high frequency variations in the receiver. The enhanced compliance improves transfer efficiency and image quality. In addition, sectioned overcoat can be used on a compliant belt without exhibiting defects.

DETAILED DESCRIPTION OF THE PREFERRED EMBODIMENT

Figure 1:
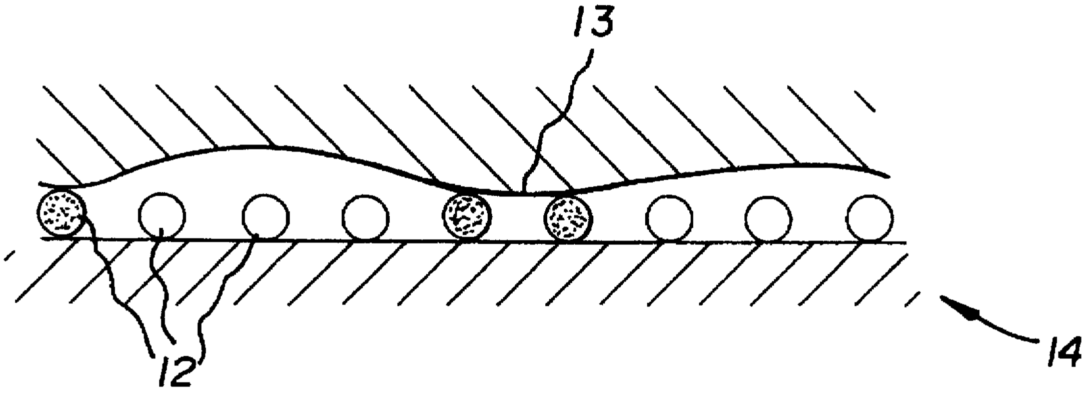
FIG. 1 PRIOR ART
FIG. 1 is cross-sectional view of a prior art intermediate transfer member and receiver, showing surface irregularities on the receiver.
Figure 2:
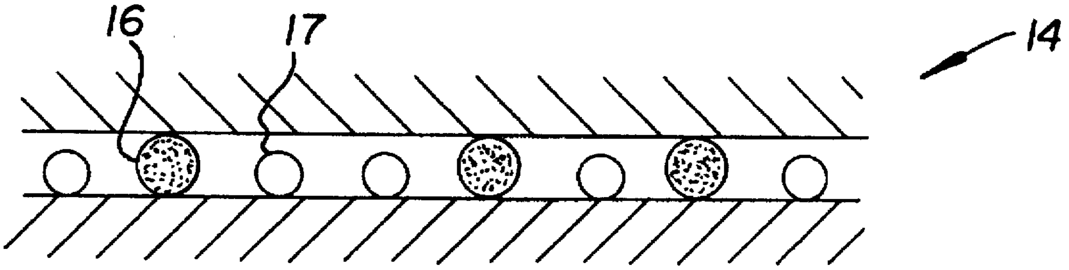
FIG. 2 PRIOR ART
FIG. 2 is a cross-sectional view of a prior art intermediate transfer member and receiver, showing toner particles having a variety of sizes.
Figure 3:
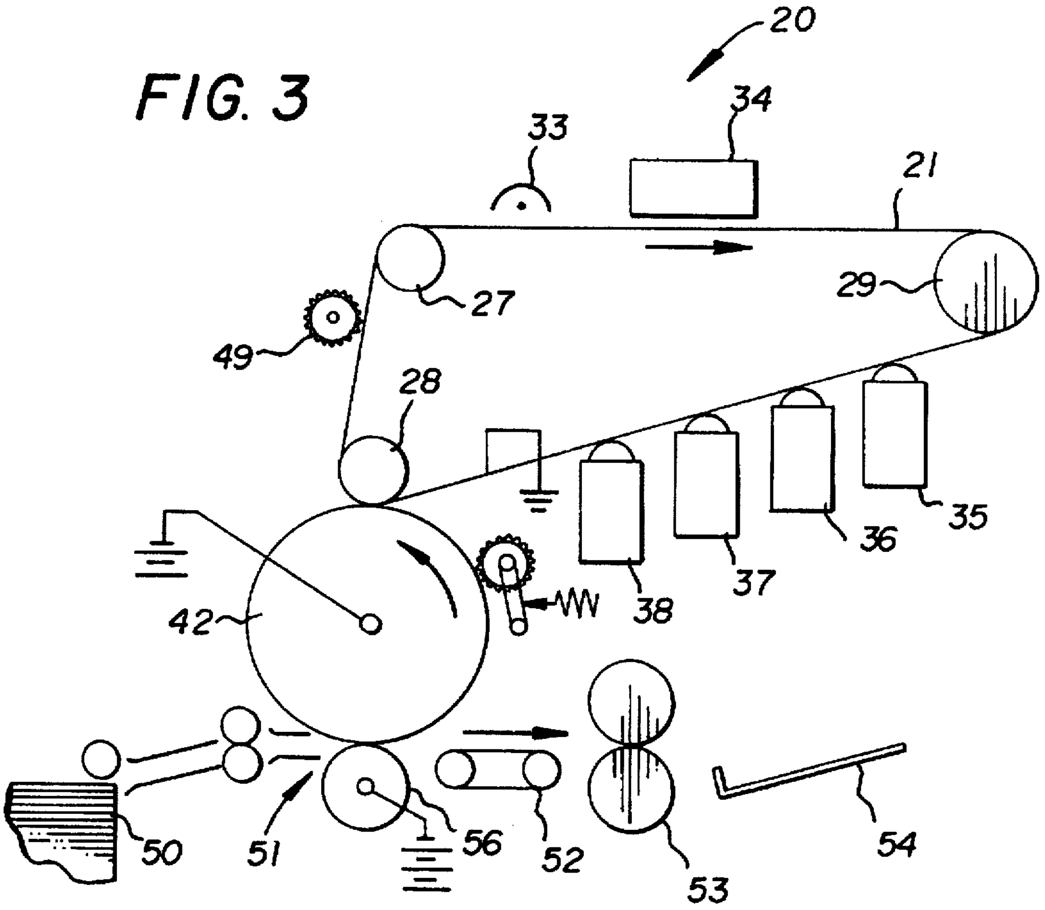
FIG. 3 is a schematic side view of a color printer apparatus utilizing the invention.

FIG. 3 illustrates an apparatus 20 in which the invention is intended to be used. A primary image member 21, for example, a photoconductive web, is trained about rollers 27, 28, and 29, one of which is drivable to move primary image member 21 past a series of stations well known in the electrophotographic art. Primary image member 21 is uniformly charged at a charging station 33, imagewise exposed at an exposure station 34 by means of, for example, an LED print head or laser electronic exposure station, to create an electrostatic latent image. The latent image is toned by one of toner stations 35, 36, 37, or 38 to create a toner image corresponding to the color of toner in the station used.

The toner image is transferred from primary image member 21 to an intermediate transfer member, for example, an intermediate transfer roller 42, at a transfer station formed with roller 28. Primary image member 21 is cleaned at a cleaning station 49 and reused to form more toner images of different colors, utilizing toner stations 35, 36, 37, and 38. One or more additional images are transferred in registration with the first image transferred to roller 42, to create a multi-color toner image on the surface of transfer roller 42.

The multi-color image is transferred to a receiving sheet which has been fed from supply 50 into transfer relationship with intermediate transfer roller 42 at transfer station 51. The receiving sheet is transported from transfer station 51 by a transport mechanism 52 to a fuser 53 where the toner image is fixed by conventional means. The receiving sheet is then conveyed from the fuser 53 to an output tray 54.

The toner images are transferred from the primary image member 21 to the intermediate transfer roller 42 in response to an electric field applied between the core of roller 42 and a conductive electrode forming a part of primary image member 21. The multi-color toner image is transferred to the receiving sheet at transfer station 51 in response to an electric field created between a backing roller 56 and transfer roller 42. Thus, transfer roller 42 helps establish both electric fields. As is known in the art, a polyurethane roller containing an appropriate mount of anti-static material to impart some conductivity, can be used for establishing both fields. Typically, the electrode buried in primary image member 21 is grounded for convenience in cooperating with the other stations in forming the electrostatic and toner images. If the toner is a positively-charged toner, an electrical bias applied to intermediate transfer roller 42 of typically −200 to −1500 volts will effect substantial transfer of toner images to intermediate transfer dram 42. To transfer the toner image onto a receiving sheet at transfer station 51, a bias of about −3000 volts, is applied to backing roller 56 to again urge the positively charged toner to transfer to the receiving sheet. Schemes are also known in the art for changing the bias on drum 42 between the two transfer locations so that the bias of roller 56 need not be at such a high potential.

Figure 4:
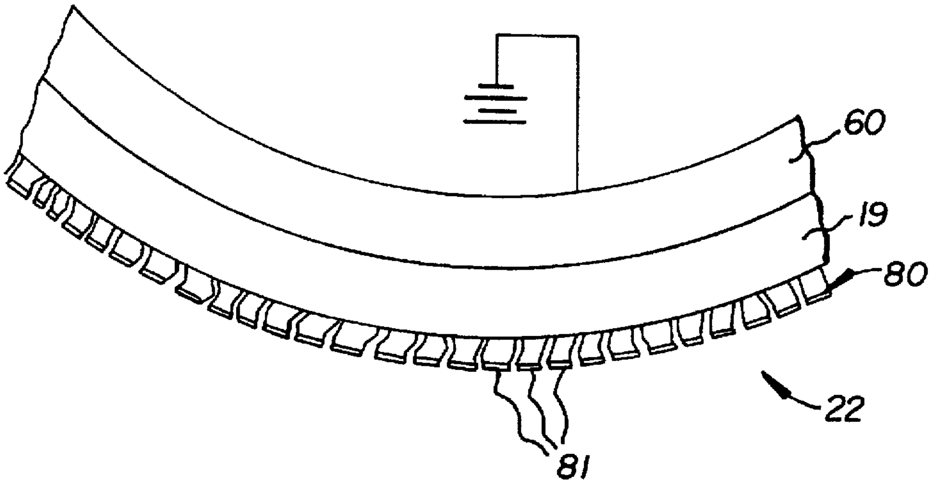
FIG. 4 is a cross-section of a portion of an intermediate transfer roller or drum constructed according to the invention.

A partial cross-section of a preferred embodiment of a transfer intermediate member is shown in FIG. 4 in which the transfer roller 42 has a compliant blanket 19, comprised of an elastomeric material such as polyurethane. The compliant blanket 19 has a thickness of greater than 0.1 mm and the thickness is preferably in the range of 2 mm to 20 mm. The compliant blanket 19 supported by a drum 60, fabricated of a rigid material such as aluminum.

The compliant blanket 19 must be flexible enough to conform to the irregularities encountered in electrostatic toner transfer. This is accomplished by using an elastomeric material that has a Young's modulus of between 0.5 MPa. (MegaPascals) and 10 MPa. Preferably; the Young's modulus of the compliant blanket should lie between 1.0 MPa. and 5 MPa.

The compliant blanket of the intermediate transfer member typically would not be insulative so that an electric field could be applied to cause transfer. The optimum resistivity of the elastomeric blanket is affected by the thickness of the intermediate transfer member, the speed of the process, and the geometry of the transfer system. The elastomeric material should have an electrical resistivity between about $10^6$ ohm-cm and about $10^{12}$ ohm-cm, and preferably between about $10^8$ and about $10^{10}$ ohm-cm. Examples of suitable materials for the compliant blanket include but are not limited to: polyurethane, silicone rubber, and silicone foam.

Figure 5:
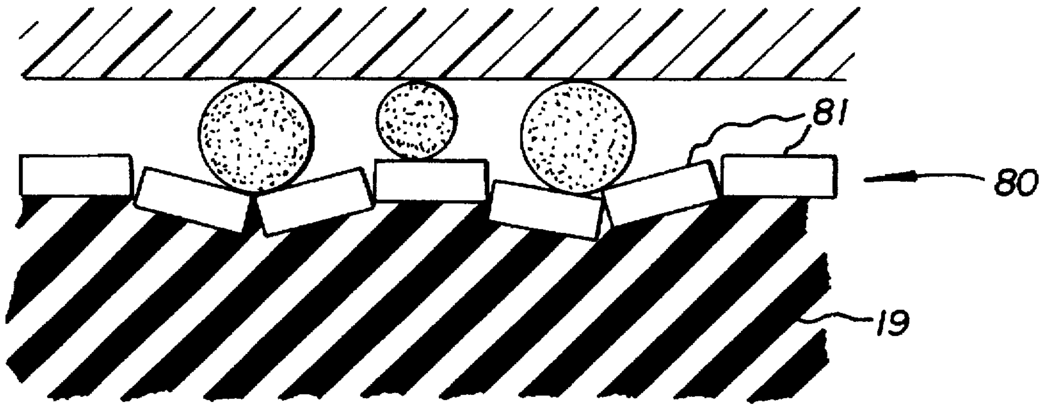
FIG. 5 is a cross-section of a portion of an intermediate transfer member in the form of a web, according to an alternate embodiment of the invention.
Figure 6A:
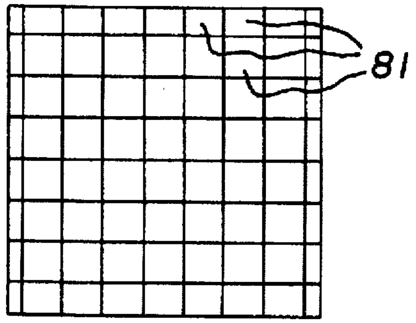
FIGS. 6(*a*)–6(*d*) are top plan views of sectioned overcoats on the intermediate member according to the present invention.
Figure 6B:
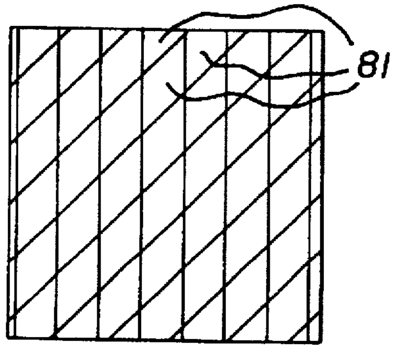
Figure 6C:
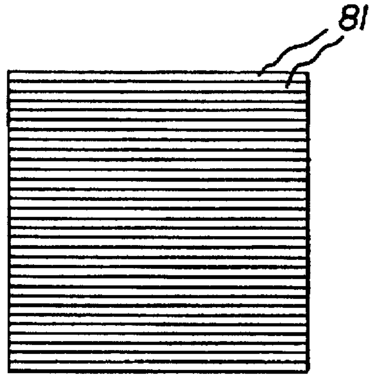
Figure 6D:
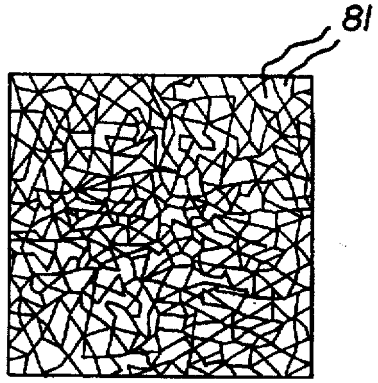

A hard, sectioned overcoat 80 is formed on top of the compliant blanket 19. Increased compliance of the intermediate transfer member is achieved, without affecting the release properties of the overcoat, by having a hard thin overcoat that is sectioned in a controlled manner, which extends through the overcoat. The segments 81, are free to move somewhat independently of the surrounding sections as shown in FIG. 5. This independence of movement enhances the micro-compliance of the intermediate transfer member when compared to an intermediate transfer member having a continuous overcoat.

The sectioned overcoat can be formed on the intermediate transfer member in many different ways, all of which enhance micro-compliance. Examples of methods of sectioning the overcoat include etching, either chemically, with laser, or other radiation; cracking the layer in a controlled manner with mechanical means, such as bead-blasting, rolling the surface across a dimpled surface or, in the case of a belt, simply running the belt over a roller of small diameter, and under tension; or by selection of an appropriate solvent in cases where the overcoat is a thermoplastic. To achieve cracking by the next to last method recited, the ratio of the thickness of the compliant blanket and overcoat, to the diameter of the roller, should be greater than 0.1 and preferably greater than 0.2. The tension is not critical.

The shape of the segments 81 of the overcoat are not critical and can be regularly shaped, e.g., square, hexagonal, or rectangular, as shown in FIGS. 6(*a*) and 6(*b*), or they can be irregular, as shown in FIG. 6(*d*). Long thin segments would also be acceptable as shown in FIG. 6(*c*). It is preferred that the longest dimension of each segment be less than 1.0 mm, regardless of the shape. For very high quality imaging, even smaller segments are preferred, wherein the largest dimension of any segment is less than 0.3 mm, so that any resultant sectioning of the final image is not perceptible by the human eye.

The thickness of the sectioned overcoat should be between 0.1 and 20 μm and preferably between 1 and 10 μm. Many materials are suitable for the overcoat and examples include but are not limited to: polyurethane, and diamond-like carbon. The Young's modulus of the sectioned overcoat should be significantly larger than the underlying blanket and is preferably greater than 80 MPa. The electrical resistivity of the sectioned overcoat is not an important consideration when the overcoat is very thin. However, it is preferred that the resistivity be in the range of $10^7$ ohm-cm and $10^{13}$ ohm-cm.

The overcoat should be strongly bonded to the compliant blanket to preclude delamination. A preferred method is to coat layers of the polymer overcoat material on the compliant blanket so that the polymer chains of the layers are interpenetrating. Sol-gel technology may be used to deposit the overcoat on the compliant blanket. Sol-gel refers to material that is actually gelatinous when applied, but a solid when cured. Alternatively, other methods such as chemical bonding and the use of adhesion promoters or adhesives could be used.

Figure 7:
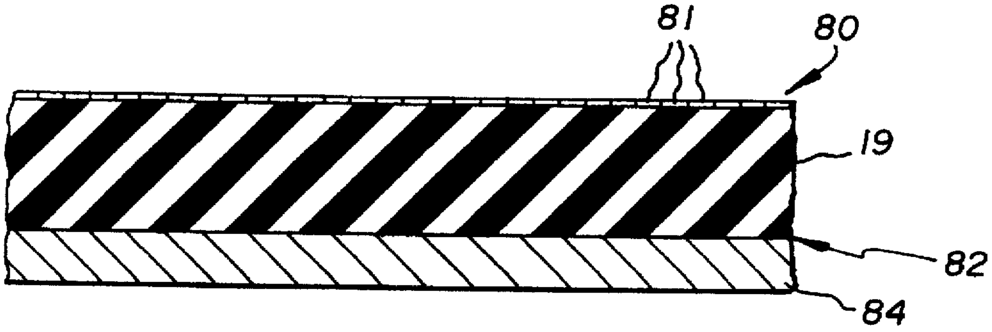
FIG. 7 is a cross-sectional view of an intermediate transfer member according to the present invention.

The multilayer structure comprised of compliant blanket and overcoat, described above, must reside on a supporting layer, such as a drum, or a web. When employing an electrostatic transfer means, the support should be sufficiently conductive so that a voltage applied to it affects transfer of the toned image. In an alternative embodiment, a conducting layer 82 is isolated between the supporting layer and the compliant blanket as shown in FIG. 7. The transfer bias would then be applied to the conducting layer.

The intermediate transfer member structure described in this disclosure is suitable for use as a roller or a web belt. The intermediate transfer member, when it takes the form of a web, can be made to traverse an irregular path. For use as a web, the intermediate transfer member consists of a compliant blanket 19 and overcoat 80 with the properties described above, optional conducting layer 82, and backing member 84. It is preferred, however, to incorporate backing member 84, shown in FIG. 7, adjacent to the compliant blanket 19.

Backing member 84 consists of a flexible material having a Young's modulus greater than 1 GPa (GigaPascal) and serves as a support for the elastomeric blanket 19. When used without conducting layer 82, this material should be sufficiently conductive so as to allow the intermediate transfer member to be electrically biased. In this embodiment, the transfer bias can be applied using techniques such as incorporating electrically biased, conducting back-up rollers in the transfer nips. Suitable backing member materials include nickel and stainless steel, which can be made sufficiently thin so as to allow them to flex around any rollers and angles encountered in the path of the web. Alternatively, polymers or other materials having suitable Young's modulus and flexibility are also acceptable. If the material used for the backing member is electrically insulating, it should be coated with an electrically conductive layer such as evaporated nickel on the side contacting the compliant blanket. It is preferable, however, to use a semi-conducting support, such as a polymeric material having a sufficiently high Young's modulus, doped with a charge transport material, such as those described in U.S. Pat. Nos. 5,212,032; 5,156,915; 5,217,838; and 5,250,357. This allows the voltage applied to the web to be varied spatially.

When using the intermediate transfer member structure defined here, the problem of image defects are avoided. The sectioning of the overcoat allows the outer surface of the intermediate transfer member to stretch when it travels over rollers because the coating is essentially comprised of separate segments which are free to move independently.

EXAMPLE 1

An intermediate transfer system according to the present invention was constructed which included a photoconductive element, a roller and a backup roller. The photoconductive element was an organic photoconductor such as those found in the Kodak 2100 copier duplicator.

The intermediate transfer member consisted of a compliant blanket and a sectioned overcoat, over an aluminum core. The compliant blanket was 5.1 mm thick and was composed of polyurethane doped with an antistatic material, to yield a resistivity of $10^9$ ohm-cm. The Young's modulus of the compliant blanket was 2 MPa. The overcoat was a urethane resin sold under the trade name Permuthane® by Stahl Finish. The thickness of the overcoat was 12 μm, the Young's modulus was 320 MPa, and the resistivity was $10^{12}$ ohm-cm. The diameter of the intermediate transfer member was 146 mm.

The intermediate transfer member was prepared as follows. TU-400 is a commercially available two part polyurethane system from Conap, Inc., Olean, N.Y. TU-400 Part A is a polyisocyanate resin, and TU-400 Part B is a hardening agent consisting primarily of a chain extender and a catalyst. An antistat comprising a complex of one mole sodium iodide with three moles diethylene glycol was prepared. To a three liter glass kettle containing 7.876 grams antistat, 1041.240 grams TU-400 part B were added. The mixture was mechanically stirred for three minutes at room temperature. Then 1601.18 grams of TU-400 Part A were added to the kettle and the reaction was mixed under nitrogen for five minutes. The incorporated nitrogen was removed under reduced pressure (0.1 mm Hg) and the mixture was poured into a prepared mold with a roller core in the middle. The polyurethane was cured at 80° C. for sixteen hours. After eighteen hours, the roller was removed from the mold and ground to 14.6 cm in diameter. The roller was then overcoated with 12 μm layer of Permuthane U6729.

Figure 8:
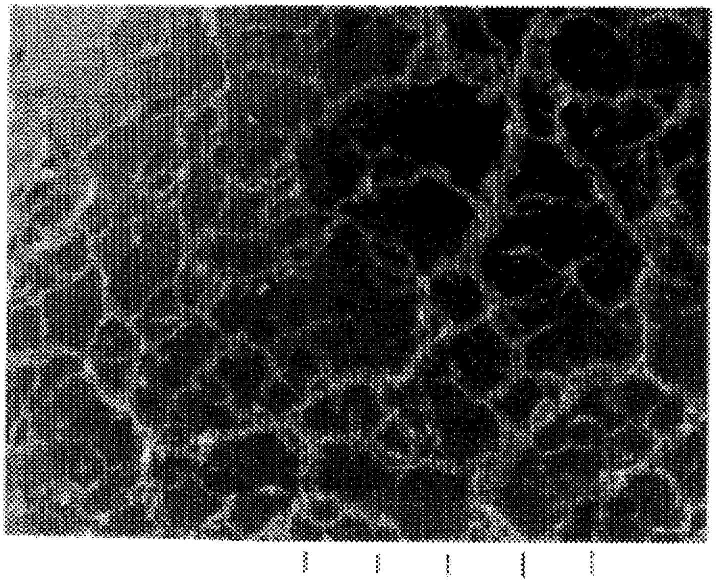
FIG. 8 is a photograph of the surface of an intermediate transfer roller according to the present invention, used in Example 1.

The irregular segments on the overcoat, shown in a photograph in FIG. 8, was made by rolling a hard, small diameter roller across the overcoat at high pressure. The resulting segments formed in the overcoat had dimensions ranging from about 0.1 mm to 0.5 mm. To achieve transfer from the intermediate transfer member to the receiver, the receiver was passed through a nip formed by the intermediate transfer member and a backing roller. The backing roller consisted of a steel core, with a layer of polyurethane doped with antistat to achieve a resistivity of $2\times10^9$ ohm-cm. The thickness of the polyurethane layer on the backing roller was 5.1 mm and the Young's modulus was 40 MPa. The diameter of the backing roller was 37 mm.

The marking toner was comprised of a 3.5 micron diameter, volume weighted diameter dry toner made by the limited coalescence process (silica stabilized). The binder was Piccotoner® 1221 binder, a styrene butylacrylate copolymer (80/20), available from Hercules Sanyo Inc. The pigment was bridged aluminum phthalocyanine, 12.5% by weight of the toner. The charge agent was tetradecylperidinium tetraphenyl borate, 0.4% by weight of the toner. The charge to mass ratio of the toner was 62 μC/g (micro Coulombs per gram) and the toner concentration of the developer was 6% by weight of the developer. The marking toner adhering to the surface of the toner particles had 0.1 μm diameter silica particles, called transfer assisting addenda, comprising 0.5% by weight based on the weight of the toner particles. The brand of these particles is T604, available from DeGussa Corp. The transfer assisting adenda particles were dry blended using a Hobart mixer with the toner particles to achieve a uniform distribution of adhered or embedded or both, transfer assisting particles on the toner particles. The carrier was a lanthanum doped, hard ferrite core coated with a 1:1 blend of a polyvinylidene fluoride, Kynar 301 F (Penwalt Corp.) and polymethylemethacrylate made as described in U.S. Pat. No. 4,764,445.

The method of depositing the toner onto the photoconductor was the same as the process used in the Kodak ColorEdge copier duplicator, a product previously manufactured by the Eastman Kodak Company.

The marking toner was developed on a single frame of the photoconductor to yield a toner scale or patches having a range of image densities. The marking toner frame was then transferred to the intermediate transfer member by applying 700V to the core of the intermediate transfer member. The patches were then transferred to a clay coated paper, Krome Kote®, produced by Champion, Inc. in the transfer nip formed by the intermediate transfer member and the backing roller by applying a potential difference of 2300V between the intermediate transfer member and the backup roller.

The sectioned overcoat introduced no defects or image degradation in the print, and excellent transfer efficiency was demonstrated.

EXAMPLE 2

Example 2 used the same process and parameters as in Example 1 except that a different intermediate transfer member and different marking toner were used. The intermediate transfer member was a roller consisting of a compliant blanket layer and an overcoat. The compliant blanket consisted of polyurethane material doped with antistatic material having a resistivity of $4\times10^8$ ohms-cm, a thickness of 5.1 mm, and a Young's modulus of 3.8 MPa. The overcoat consisted of a 12 mm thick layer of Permuthane® available from ICI (Imperial Chemical Industrials PLC).

The intermediate transfer member was prepared as follows. L42 is a polyisocyanate resin available from Uniroyal. EC-300 is an amine chain extender available from Ethyl corporation. An antistat complex comprising one mole ferric chloride and three moles diethylene glycol, was added to a three liter glass beaker containing 0.437 grams tetraethylene gylcol, and the mixture was stirred for five minutes. Then 846.76 grams of L42 resin were added and the reaction was stirred for two minutes. Then 9.53 grams of EC-300 were added and the reaction was stirred for five minutes and then the air was removed under reduced pressure (0.10 mm Hg). The resulting mixture, which is a type of polyurethane, was poured into a prepared mold with a roller core in the middle and was cured at 80° C. for eighteen hours. The roller was removed form the mold and ground to a diameter of 14.6 cm. The roller was then overcoated with a thin 12 micron layer of Permuthane U6729.

Figure 9:
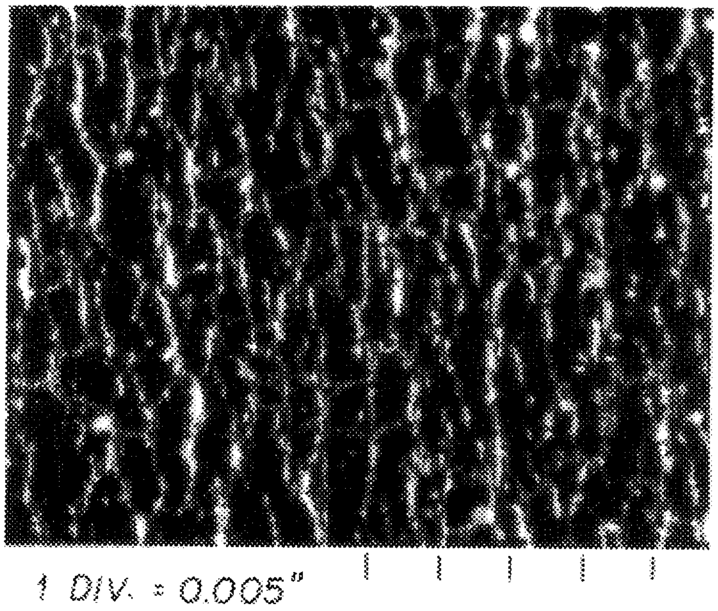
FIG. 9 is a photograph of the surface of an intermediate transfer roller according to the present invention, used in Example 2.

The sectioned overcoat, shown in FIG. 9, was formed as in Example 1. The harder blanket resulted in smaller segments which averaged about 0.3 mm in length and 0.1 mm in width. The sectioned overcoat introduced no defects in the final print and excellent transfer efficiency was demonstrated. The marking toner was the same as in Example 1 except that it had no silica transfer assisting addenda. Materials suitable for transfer assisting addenda particles include titanium dioxide and magnetite. An acceptable range for the diameter of the transfer assisting addenda particles is 0.03 to 0.2 μm.

The invention has been described in detail with particular reference to preferred embodiment thereof, but it will be understood that variations and modifications can be effected within the spirit and scope of the invention as set forth in the claims.

| PARTS LIST | |
|---|---|
| 12. Toner particles | 36. Toner station |
| 13. Peaks | 37. Toner station |
| 14. Receiver | 38. Toner station |
| 15. Valleys | 42. Transfer roller drum |
| 16. Large Particles | 49. Cleaning station |
| 17. Small particles | 50. Supply |
| 18. Overcoat | 51. Transfer station |
| 19. Compliant blanket | 52. Transport mech. |
| 20. Apparatus | 53. Fuser |
| 21. Primary Image member or Photoconductive web | 54. Output tray |
| 27. Roller | 56. Backing roller |
| 28. Roller | 60. Support |
| 29. Roller | 80. Sectioned overcoat |
| 33. Charging station | 81. Segments |
| 34. Exposure station | 82. Conducting layer |
| 35. Toner station | 84. Backing member |

We claim:

1. An intermediate transfer member for transferring a toner image from a primary image member in an electrophotographic apparatus to a receiving sheet, comprising:

a substrate;

a compliant blanket attached to a surface of said substrate; and an overcoat, bonded to said complaint blanket, sectioned into small segments wherein said segments are less than about 1 mm at a longest dimension.

2. An intermediate transfer member as in claim 1 wherein said overcoat has a thickness between about 0.1 and about 20 μm.

3. An intermediate transfer member as in claim 1 wherein said overcoat has a thickness in the range of approximately 1 to approximately 10 μm.

4. An intermediate transfer member as in claim 1 wherein said overcoat has a Young's modulus of greater than approximately 80 MPa.

5. An intermediate transfer member as in claim 1 wherein said compliant blanket is an elastomeric material.

6. An intermediate transfer member as in claim 5 wherein said elastomeric material has an electrical resistivity between $10^6$ ohm-cm and $10^{12}$ ohm-cm.

7. An intermediate transfer member as in claim 5 wherein said elastomeric material is between 0.1 mm and 20 mm thick.

8. An intermediate transfer member as in claim 1 wherein said elastomeric material is a polyurethane layer.

9. An intermediate transfer member as in claim 1 wherein said toner image is comprised of toner particles have a volume weighted diameter between about 1 and about 10 μm.

10. An intermediate transfer member as in claim 9 wherein said toner particles have a volume weighted diameter between about 3.0 and about 8.0 μm.

11. An intermediate transfer member as in claim 9 wherein said toner particles have transfer assisting addenda on a surface of the toner particles.

12. An intermediate transfer member as in claim 1 wherein said segments are formed by etching.

13. An intermediate transfer member to claim 1 wherein said segments are formed by a laser.

14. An intermediate transfer member to claim 1 wherein said segments are formed by cracking said overcoat in a controlled manner.

15. An intermediate transfer member as in claim 1 wherein said segments are formed by bead blasting said overcoat.

16. An intermediate transfer member as in claim 1 wherein said segments are formed by rolling said overcoat across a dimpled surface.

17. An intermediate transfer member as in claim 1 wherein said segments are squares.

18. An intermediate transfer member as in claim 1 wherein said segments are hexagons.

19. An intermediate transfer member as in claim 1 wherein said segments are irregular in shape.

20. An intermediate transfer member as in claim 1 wherein said intermediate transfer member is a web.

21. An intermediate transfer member as in claim 1 wherein said intermediate transfer member is a roller.

* * * * *

UNITED STATES PATENT AND TRADEMARK OFFICE

CERTIFICATE OF CORRECTION

PATENT NO. : 5,689,787

DATED : November 18, 1997

INVENTOR(S) : Thomas N. Tombs, et al

It is certified that error appears in the above-identified patent and that said Letters Patent is hereby corrected as shown below:

Col. 8, line 24 delete "form" and insert --from--.

Col. 9, line 1 delete "complaint" and insert --compliant--.

Signed and Sealed this

Ninth Day of June, 1998

Attest:

Bruce Lehman

BRUCE LEHMAN

*Attesting Officer*

*Commissioner of Patents and Trademarks*